Figure 1A:
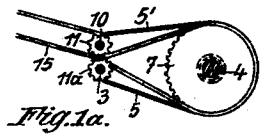

June 24, 1930. E. WELSCH 1,768,224
AUTOMATIC LOCKING PLANT FOR VEHICLE DOORS
Filed Feb. 20, 1929 2 Sheets-Sheet 1

Inventor:
Egon Welsch,
Att'y.

June 24, 1930.  E. WELSCH  1,768,224
AUTOMATIC LOCKING PLANT FOR VEHICLE DOORS
Filed Feb. 20, 1929  2 Sheets-Sheet 2
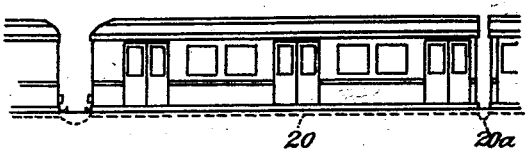
Fig. 8.
Fig. 6.
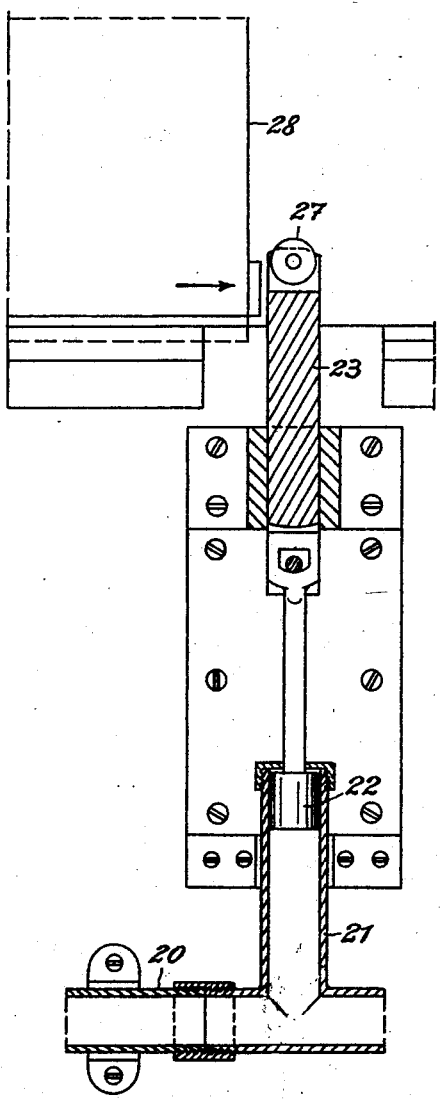
Fig. 7.
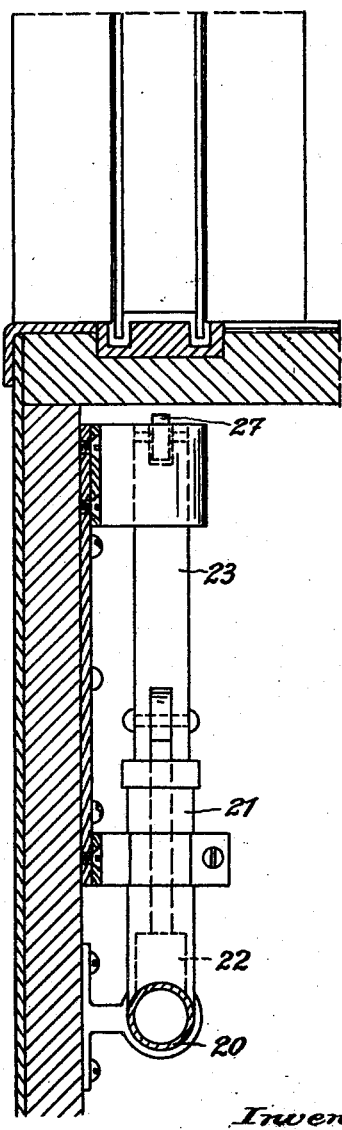
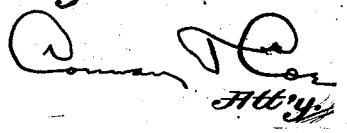
Inventor:
Egon Welsch,
Atty Patented June 24, 1930

1,768,224

UNITED STATES PATENT OFFICE

EGON WELSCH, OF BERLIN-BRITZ, GERMANY

AUTOMATIC LOCKING PLANT FOR VEHICLE DOORS

Application filed February 20, 1929, Serial No. 341,517, and in Germany August 11, 1928.

It is known to drive piston liquid-pumps by axles of railway cars, and to subject a current of liquid to pressure by the respective pump, this liquid lifting a piston, by the movement of which the car doors are locked and apertures are uncovered through which the liquid can flow back to the pump. The known devices of this kind suffer from the drawback that they necessitate numerous complicated arrangements and combinations of parts comprising, for instance, valves of various types, rods, etc., which not only render the safety device expensive, as well as uneconomical, but also render the reliable operation of the device questionable.

The present improved device excels the known ones by its very great simplicity, as well as its perfect working reliableness. According to this invention a centrifugal pump, preferably a centrifugal blower is driven by a car axle, and compressed air is produced by this blower as soon as the car has attained a certain speed. That air is conducted by pipes to the locking devices provided at the individual doors and actuated by that air. Preferably, every locking device is combined with a piston which is lifted by the compressed air and by the medium of which this air acts upon the respective locking device. When the speed of the car lessens or the car comes to a standstill the rotary blower ceases to produce a current of air under pressure, in consequence whereof the up to then lifted piston sinks back so that the locking device is released and the door can be opened.

Making use of a rotary blower presents the great advantage that control devices for the prevention of a too high rise of the pressure can be dispensed with, in that the pressure which centrifugal blowers are able to produce cannot be driven beyond a certain maximum height to which, of course, a corresponding number of revolutions is required. But any increase of this number of revolutions does not entail a corresponding increase of the pressure, but serves merely for maintaining that maximum pressure. If, on the other hand, the number of revolutions of the centrifugal blower sinks below that necessary to attain that maximum pressure, the pressure falls in a practically corresponding degree, and becomes zero when the blower comes to a standstill, as the compressed air that has been present in the pipes can escape into the atmosphere through the blower.

A locking device designed according to this invention operates perfectly automatically. This constitutes a great advantage in that with the known locking devices which are to be actuated by an attendant of the car or train the possibility exists that, for instance in the case of an accident, the attendant forgets, or is no more able, to release the locking devices, in which case the passengers are locked up. This is impossible with the present improved device, as the locking devices of the individual doors are automatically released at all events.

There may be one rotary blower for all cars of a train, or every car may have a blower of its own. In the first case the pipes by which the locking devices of the individual doors are connected with one another, are also connected with one another between the individual cars by elastic pipes or hoses, as known in connection with railway brakes and the like, and the continuous pipe line communicates with the rotary blower which may be mounted at any suitable part of the train.

Figure 5:
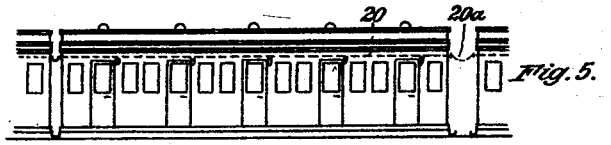
Figure 2:
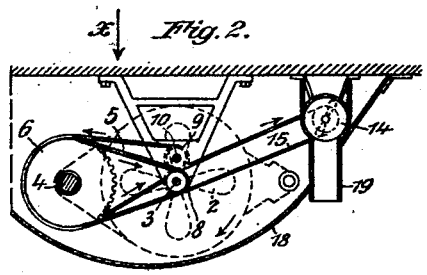
Figure 1:
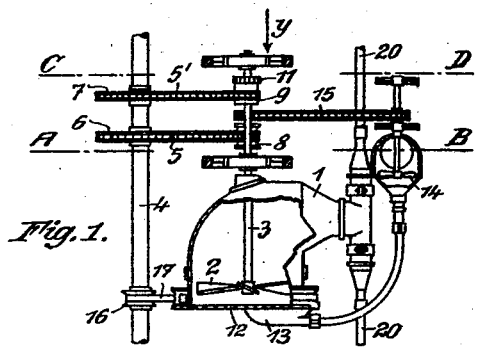
Figures 3, 4:
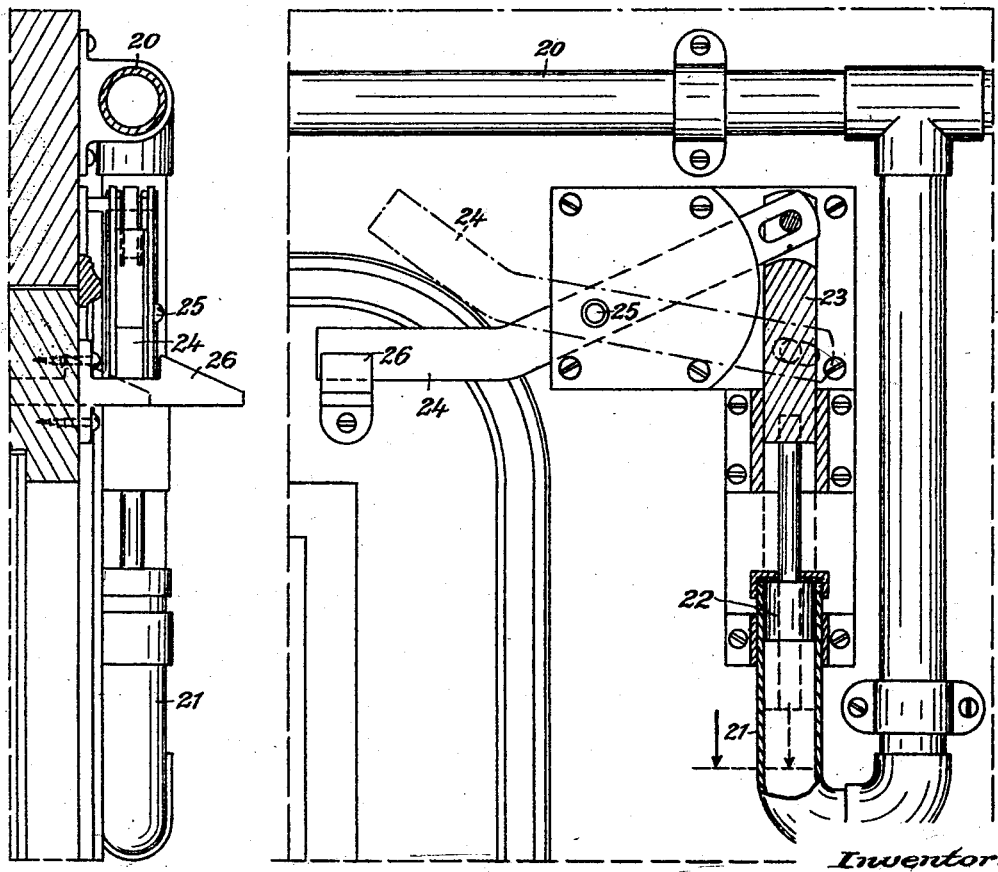

The invention is illustrated diagrammatically and by way of example on the accompanying drawing, on which are shown several constructional forms particularly suitable for the purpose in view. Fig. 1 is a plan, partly in section, of a centrifugal blower designed according to this invention together with certain driving means and other parts, the figure being seen in the direction indicated by the arrow $x$ in Fig. 2; Figure 1ᵃ is a section in the plane C—D of Fig. 1 being seen in the direction indicated by the arrow $y$ in Fig. 1; Figure 2 is a vertical section in the plane A—B of Fig. 1; Figure 3 is a side-view of a locking device also designed according to this invention and Figure 4 a front-view of this locking device, partly in section; this device being shown in connection with certain parts of a flap-door to which it is attached; Figure 5 is a side-view of a railway-car having flap doors provided with the improved locking device and Figures 6 and 7 are views similar to Figs. 3 and 4, and show the locking device in connection with a sliding door, of which only a few parts are illustrated; Figure 8 is a side view of a railway car having sliding doors, provided with the improved locking device.

On the drawing, 1 (Fig. 1) denotes a casing in which rotates a blade-wheel 2 affixed to a shaft 3 driven by the car axle 4 by the medium of chain-wheels and chains. In order to produce compressed air, the blade-wheel must be rotated always in a certain definite direction, irrespective of whether the car is running in the one or the other direction of the track. For this reason the axle 4 is provided with two chain-wheels 6 and 7, of which 6 is coupled by a chain 5 with a chain-wheel 8 attached to the blade-wheel spindle 3 by the intermediary of a free-wheel mechanism. The chain wheel 7, however, is coupled by a chain 5' with a cog-wheel 9 secured to a sleeve located upon a separate shaft 10 and provided with a pinion 11 meshing with a cog-wheel (11$^a$) attached to the spindle 3 also by the intermediary of a free-wheel mechanism. The arrangement of the two free-wheel mechanisms relatively to one another is such that always only one of them is operative, the one being operative in the one direction the other in the other direction of the axle 4, whereas the spindle 3 is rotated in both cases in the same direction so as always to be able to compress air. This continually uniform direction of rotation is rendered possible by the pinion or intermediate wheel 11, as will be clear without a more detailed description.

In order to render the operation of the device perfectly reliable, it is extraordinarily important that the interior of the centrifugal blower or fan, as well as the interior of the air-conducting pipes, be kept perfectly free from dirt, and for this purpose a sieve 12 is provided below the blade-wheel so that the air can enter into the fan casing solely through said sieve. However, also the sieve must be kept continually clean, and for this purpose a dust-sucking apparatus 13 is arranged below the sieve in close proximity to it. The suction air is produced by a small blade-wheel 14 driven by the spindle 3 by the intermediary of a chain and chain-wheel gearing 15. The suction member proper 13 is narrow and of longitudinal and preferably wedge-like shape so as to cover only a small portion of the sieve 12 and to affect the sucking action of the blade-wheel 2, therefore, only quite immaterially. As it is, of course, necessary to clean the sieve in its entire extent, it is provided with a rim adapted to hold a belt, and the axle 4 is provided with a small pulley 16 rotating the sieve continually by means of a belt 17. It is obvious that the sieve is in this way kept continually clean and in proper operative state.

Furthermore, to prevent also all power-transmitting parts from being soiled, they, as well as the blowers, are surrounded with protective sheet-metal plates 18, of which a portion of that plate which is located nearest the sieve 12 is provided with apertures of such a shape that the outer air can freely flow through them to the blower (1, 2, 3) whereas spirted dirt and other foreign substances are prevented from passing through those apertures.

The outlet branch 19 of the suction apparatus 13, 14 projects downwardly through the protective plate 18 below it so that the dust-laden air escaping through said branch cannot possibly find access to the blow-fan, the gearing and the air-pipes.

The compressed air produced in the centrifugal blower 1, 2 passes over into air-tight pipes 20 by which it is conducted to the several locking devices pertaining to the doors of the car. Each of these devices comprises a cylinder 21 enclosing a piston 22 carrying an externally arranged weight 23, as in Fig. 4. The constructional form illustrated in the Figs. 3 and 4 is intended for flap doors, and the piston 22 is connected with a double-armed lever 24 supported on the pivot 25 at the wall of the car near the respective door. The free end of the lever 24 can engage a hook 26 provided on the door, and engages it when the piston 22 is lifted into its highest position (as in Fig. 4) by the compressed air. The hook 26 is wedge-shaped at its free end, as shown in Fig. 3, so that the flap door can be closed also if the lever 24 is in its locking position, it then giving way counter to the pressure of the compressed air. When the door has been closed, the lever 26 engages at once the recess of the hook 26 under the action of the compressed air.

In Fig. 5 which shows a railway car is illustrated how the locking devices are attached to the car wall relatively to the individual doors. They are located at the top, on the side to be opened, and are connected with one another by a common compressed-air pipe 20 extending along the car. The individual pipes 20 of the individual cars are connected with one another by elastic intermediate pieces 20$^a$. In this case only one centrifugal blower, or a centrifugal blowing device of the kind shown in Figs. 1 and 2, is provided for all cars of the train.

In the constructional form shown in Figs. 6 and 7 which is intended for cars with sliding doors the weight 23 carries a roll 27 on its top. The door cannot be opened as long as the piston 23 (with its roll 27) is maintained in lifted position by the compressed air. The locking devices are arranged near the bottom edge of the doors. The upper end of the piston with its roll projects over this edge when the parts are in their operative position. If the piston with its roll is subjected to the pressure of the compressed air while the door is still open this latter can, nevertheless, be closed manually as then the roll is pressed against the bottom edge of the door and this latter can roll along upon the roll 27 until it has assumed its proper closing position, whereafter the piston will be lifted and the closed door thereby locked.

The compressed-air pipe 20 extends, on a car having sliding doors, at the bottom thereof.

It is not necessary to provide a locking device for both halves of a door, in that the halves are mechanically connected with one another. This is a known feature with these doors and I abstain, therefore, from entering into details of the construction.

The manner of operation of the locking device is as follows:

When the train starts, the blade-wheel 2 is rotated by the car-axle 4 by the intermediary of one or the other of the chain-wheel and chain gearings (6, 5, 8 or 7, 5', 9), according to the direction of movement of the car or train, and the compressed air produced by the centrifugal blower is conducted by the pipe or pipes 20 to the individual locking devices. When the car or train has attained a certain speed, the pressure of the air will be such that it is able to lift the pistons 21 (with their weights 23), whereby the levers 24 will be so turned as to engage the hooks 26 and lock thereby the doors. This state will be maintained as long as the air pressure is maintained at the requisite height (depending upon the speed of the car or train). But if the speed decreases the air pressure will fall correspondingly and at a certain reduction of the pressure this latter will no more be able to maintain the locking members in their operative position. In other words: the levers 24 will be moved off the hooks by the weights 23, and the doors can then be opened.

I claim:

1. An automatic locking plant for vehicle doors, especially railway car doors, comprising, in combination with the individual doors of a car and with individual pneumatic locking devices for said doors, a centrifugal blower adapted to produce compressed air suited for the actuation of said locking devices; a filter arranged on the suction side of said blower, means for conducting the compressed air from said blower to said devices, means adapted to transmit power from an axle of the car to the said blower.

2. An automatic locking plant for vehicle doors, especially railway car doors, comprising, in combination with the individual doors of a car and with individual pneumatic locking devices for said doors, a centrifugal blower adapted to produce compressed air suited for the actuation of said locking devices, a rotary filter arranged on the suction side of said blower, means adapted to rotate the filter, before said filter a suction member of longitudinal wedgelike shape so as to cover only a small portion of said filter, means for conducting the compressed air from said blower to said devices, and means adapted to transmit power from an axle of the car to the said blower and to said filter.

3. An automatic locking plant for vehicle doors, especially railway car doors, comprising in combination with the individual doors of a car and with individual locking devices for the said doors, a centrifugal pump adapted to produce a compressed fluid suited for the actuation of said locking devices, means for conducting the compressed fluid from said pump to said devices; two free-wheel mechanism adapted to transmit power in opposite directions and connecting the shaft of said pump with an axle of the car, and being so arranged that said shaft is rotated always in the same direction irrespective of the direction of rotation of said axle, substantially as set forth.

4. An automatic locking plant for vehicle doors, especially railway car doors, comprising in combination with the individual doors of a car and with individual locking devices for the said doors, a centrifugal pump adapted to produce a compressed fluid suited for the actuation of said locking devices, means for conducting the compressed fluid from said pump to said devices; two free-wheel mechanism adapted to transmit power in opposite directions, one of said mechanisms connecting an axle of the car directly with the shaft of said pump, the other connecting said axle indirectly with shaft; and a reversing gearing establishing said indirect connection, substantially as set forth.

5. An automatic locking plant for vehicle doors, especially railway car doors, comprising, in combination with each of the doors of a car, a cylinder attached to the car in the proximity of the respective door, a piston in said cylinder; a double-armed lever supported at the car between the said cylinder and said door and being connected at one end with said piston and extending with its other end to the said door in front of a portion thereof; a locking member affixed to said door portion and adapted to become coupled with said lever in the operating position thereof; a centrifugal pump adapted to produce compressed fluid suited for the actuation of the pistons in the cylinders; means for conducting the compressed fluid from said pump to said cylinders; and means for transmitting driving power from an axle of the car to the said pump.

6. An automatic locking plant for vehicle doors, especially railway car doors, comprising, in combination with each of the doors of a car, a cylinder attached to the car in the proximity of the respective door, a piston in said cylinder; a double-armed lever supported at the car between the said cylinder and said door and being connected at one end with said piston and extending with its other end to the said door in front of a portion thereof; a pawl-shaped locking member affixed to said door portion and having a recess adapted to be engaged by the free end of said lever when this is turned by the appertaining piston, the free end of said member being so shaped as to be adapted to permit the lever giving way when the open door is shut; a centrifugal pump adapted to produce compressed fluid suited for the actuation of the pistons in the cylinders; means for conducting the compressed fluid from said pump to said cylinders; and means for transmitting driving power from an axle of the car to the said pump.

7. An automatic locking plant for vehicle doors, especially railway car doors, comprising, in combination with each of the doors of a car, a vertical cylinder attached to the car in the proximity of the respective door; a piston in said cylinder, a piston rod extending upwardly and outwardly from said piston; a weight secured to the outer end of the piston, a double-armed lever supported at the car between the said cylinder and said door and being connected at one end with said weight and extending with its other end to the said door in front of a portion thereof; a locking member affixed to said door portion and adapted to become coupled with said lever in the operating position thereof, said weight being adapted to move the said piston, as well the said lever, back into their position of rest after each actuation; a centrifugal blower adapted to produce compressed fluid suited for the actuation of the pistons in the cylinders; means for conducting the compressed fluid from said pump to said cylinders; and means for transmitting driving power from an axle of the car to the said pump.

In testimony whereof I affix my signature.

EGON WELSCH.